United States Patent [19]

Maddock

[11] Patent Number: 4,793,909

[45] Date of Patent: Dec. 27, 1988

[54] ELECTROLYTIC CHLORINE GENERATOR WITH SALT SPACER

[76] Inventor: Robert E. Maddock, 2252 Grant Ave., Phoenix, Ariz. 85009

[21] Appl. No.: 167,649

[22] Filed: Mar. 14, 1988

[51] Int. Cl.⁴ .................... C25B 9/00; C25B 13/02
[52] U.S. Cl. ............................ 204/266; 204/270; 204/271
[58] Field of Search ............... 204/128, 266, 263–265, 204/270, 271

[56] References Cited

U.S. PATENT DOCUMENTS

| | | | |
|---|---|---|---|
| 4,290,873 | 9/1981 | Weaver | 204/260 X |
| 4,411,759 | 10/1983 | Olivier | 204/260 X |
| 4,439,295 | 3/1984 | Richards | 204/260 X |
| 4,472,256 | 9/1984 | Hilbig | 204/266 |
| 4,500,404 | 2/1985 | Tucker | 204/266 |
| 4,599,159 | 7/1986 | Hilbig | 204/128 X |
| 4,613,415 | 9/1986 | Wreath et al. | 204/128 X |
| 4,693,806 | 9/1987 | Tucker | 204/252 |
| 4,724,059 | 2/1988 | Collier | 204/266 X |

Primary Examiner—Donald R. Valentine
Attorney, Agent, or Firm—Nissle & Leeds

[57] ABSTRACT

Electrolytic chlorine gas generating apparatus including a sousing, a volume of water inside the housing, a hollow salt cell disposed in the water in the housing, a volume of salt particles and of water in the salt cell, and anode mounted in the housing contacting salt solution in the salt cell, a cathode mounted in the housing, means for causing current to flow between the anode and cathode to generate chlorine gas at the anode, and a line attached to the housing to carry away chlorine gas produced by the anode. The apparatus, when the water level in the salt cell becomes low and the top of the salt solidifies into a "dome", prevents chlorine gas from accumulating beneath the solidified salt dome and exploding. In addition, the apparatus, by preventing direct contact of salt particles with the anode, minimizes or eliminates corrosion of and the formation of a coating of solid electrolytic by-product material on the anode, thereby minimizing maintenance of the apparatus and extending the operational life of the anode.

2 Claims, 4 Drawing Sheets

ELECTROLYTIC CHLORINE GENERATOR WITH SALT SPACER

This invention relates to apparatus for electrolytically generating chlorine gas from salt water.

More particularly, the invention relates to electrolytic chlorine gas generating apparatus of the type including a housing, a volume of water inside the housing, a hollow salt cell disposed in the water in the housing, a volume of salt particles and of water in the salt cell, an anode mounted in the housing contacting salt solution in the salt cell, a cathode mounted in the housing, means for causing current to flow between the anode and cathode to generate chlorine gas at the anode, and a line attached to the housing to carry away chlorine gas produced by the anode.

In a further respect, the invention relates to electrolytic chlorine gas generating apparatus of the type described which, when the water level in the salt cell becomes low and the top of the salt solidifies into a "dome", prevents chlorine gas from accumulating beneath the solidified salt dome and exploding.

In another respect, the invention relates to electrolytic chlorine gas generating apparatus of the type described which, by preventing direct contact of salt particles with the anode, minimizes or eliminates corrosion of and the formation of a coating of solid electrolytic by-product material on the anode, thereby minimizing maintenance of the apparatus and extending the operational life of the anode.

In a further respect, the invention relates to electrolytic chlorine gas generating apparatus of the type described which minimizes the likelihood that the apparatus will be overfilled with an excess of salt and water which clogs the line carrying chlorine gas from the apparatus and causes chlorine gas to accumulate, and possibly explode, in the apparatus.

Therefore, it is a principal object of the invention to provide improved electrolytic chlorine gas generating apparatus.

A further object of the invention is to provide improved electrolytic chlorine gas generating apparatus of the type including a housing, a volume of water inside the housing, a hollow salt cell disposed in the water in the housing, a volume of salt particles and of water in the salt cell, an anode mounted in the housing contacting salt solution in the salt cell, a cathode mounted in the housing, means for causing current to flow between the anode and cathode to generate chlorine gas at the anode, and a line attached to the housing to carry away chlorine gas produced by the anode.

Another object of the invention is to provide improved electrolytic chlorine gas generatign apparatus of the type described in which coating of the anode with electrolytic salt by-products is minimized or eliminated.

Still a further object of the instant invention is to provide improved electrolytic chlorine gas generating apparatus of the type described which prevents the apparatus from exploding when the water level in the salt cell falls below normal and the upper surface of the salt bed solidifies into a gas impervious dome.

Yet another object of the invention is to provide improved electrolytic chlorine gas generating apparatus of the type described which minimizes the likelihood that the apparatus will be overfilled with an excess of salt and water which clogs the chlorine gas vent line and causes an accumulation and possible explosion of chlorine gas in the apparatus.

Apparatus for producing chlorine gas by electrolysis of salt water is well known in the art. See, for example, U.S. Pat. No. 4,290,873 to Weaver and the various U.S. Patents cited therein. Apparatus of the type described in the Weaver Patent has several important disadvantages. First, the anode (reference character 96 in FIG. 1 of the Weaver Patent) directly contacts salt particles. Over time, this contact permits a coating or crust of electrolytic salt by-products to form on anode 96. The coating of electrolytic by-products significantly reduces the electrical efficiency of the apparatus. Second, if the level of water (reference character 210 in FIG. 2 of the Weaver Patent) falls beneath the uppermost layer of salt particles in the salt cell, this layer often solidifies into a generally solid gas impervious "dome". Chlorine gas produced by anode 96 accumulates under this dome and can explode. Finally, if the salt cell (reference character 80 in FIG. 2 of the Weaver Patent) is inadvertently overfilled with water and salt, the chlorine gas vent line (reference character 94 in FIG. 2) can be clogged, causing chlorine gas to accumulate in the salt cell and, possibly, to explode.

Accordingly, it would highly desirable to provide improved electrolytic chlorine gas generating apparatus of the general type described in U.S. Pat. No. 4,290,873 to Weaver which would minimize or eliminate coating of the anode with electrolytic salt by-products, would prevent the explosion of the apparatus when the water level in the salt cell falls below normal and a solid salt "dome" forms, and would minimize the likelihood that the apparatus could be overfilled with water and salt to clog the chlorine outlet line and cause an accumulation and explosion of chlorine gas.

These and other, further and more specific objects and advantages of the invention will be apparent to those skilled in the art from the following detailed description thereof, taken in conjunction with the drawings, in which.

Figure 1:
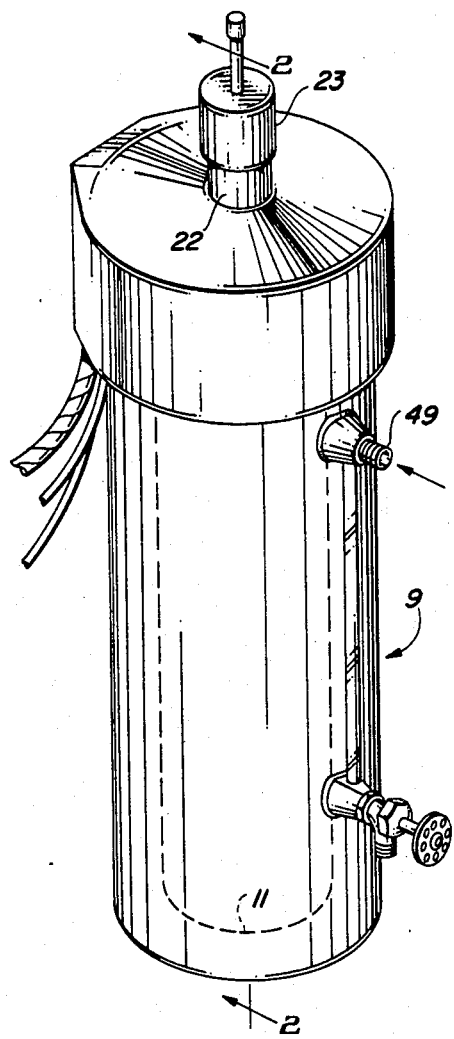
FIG. 1 is a perspective view of electrolytic chlorine gas generating apparatus constructed in accordance with the principles of the invention.

Briefly, in accordance with my invention, I provide improved apparatus for electrolytically generating chlorine gas from a salt solution. The apparatus includes hollow housing means for holding a volume of water and including an outer wall having an upper portion and a lower portion, a base connected to the lower portion, and cover means mounted on the upper portion of the housing means; a volume of water inside the housing; an elongate hollow salt cell mounted in the volume of water in the housing means, spaced apart from the outer wall, and having a volume of water and a window formed therein; an elongate perforated hollow salt spacer carried in the housing means inside and spaced apart from the salt cell, said perforations permitting water in said salt cell to flow into said salt spacer; a volume of salt inside the salt spacer; anode means mounted in the housing means adjacent the window and intermediate the salt cell and salt spacer; cathode means mounted in the housing means adjacent and spaced apart from the anode and intermediate the anode and the housing wall; and membrane means intermediate the anode and cathode means and covering the window to generally separate the aqueous salt solution within the salt cell from the aqueous solution intermediate the salt cell and the outer wall of the housing, the membrane permitting sodium ions to migrate outwardly from the salt solution through the membrane means into the water intermediate the salt cell and outer wall. Chlorine ions from within the salt spacer move outwardly through the perforations therein to contact the anode means and generate chlorine gas rising upwardly intermediate the salt cell and salt spacer.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 4 illustrate elecrolytic chlorine gas generating apparatus constructed in accordance with the principles of the invention and including a hollow housing for holding a volume of water. The hollow housing includes an outer cylindrical wall 9 having an upper portion 9A and lower portion 9B. A base is connected to the lower portion 9B of wall 9 and includes circular plate 17 and cylindrical cup 16 attached to plate 17. Cover means are attached to the upper portion 9A of wall 9 and include circular plate 19 fixedly attached to upper portion 9A of wall 9, circular flange 10, O-ring 20, circular cover 21, cylindrical site tube 22 attached to cover 21, cap 23 with aperture 24, and fill tube 25 slidably received by aperture 24. Tube 25 rests against the top 47 of the mass of salt particles in spacer 12 and is used to determine the amount of salt particles remaining in the apparatus.

Figure 4:
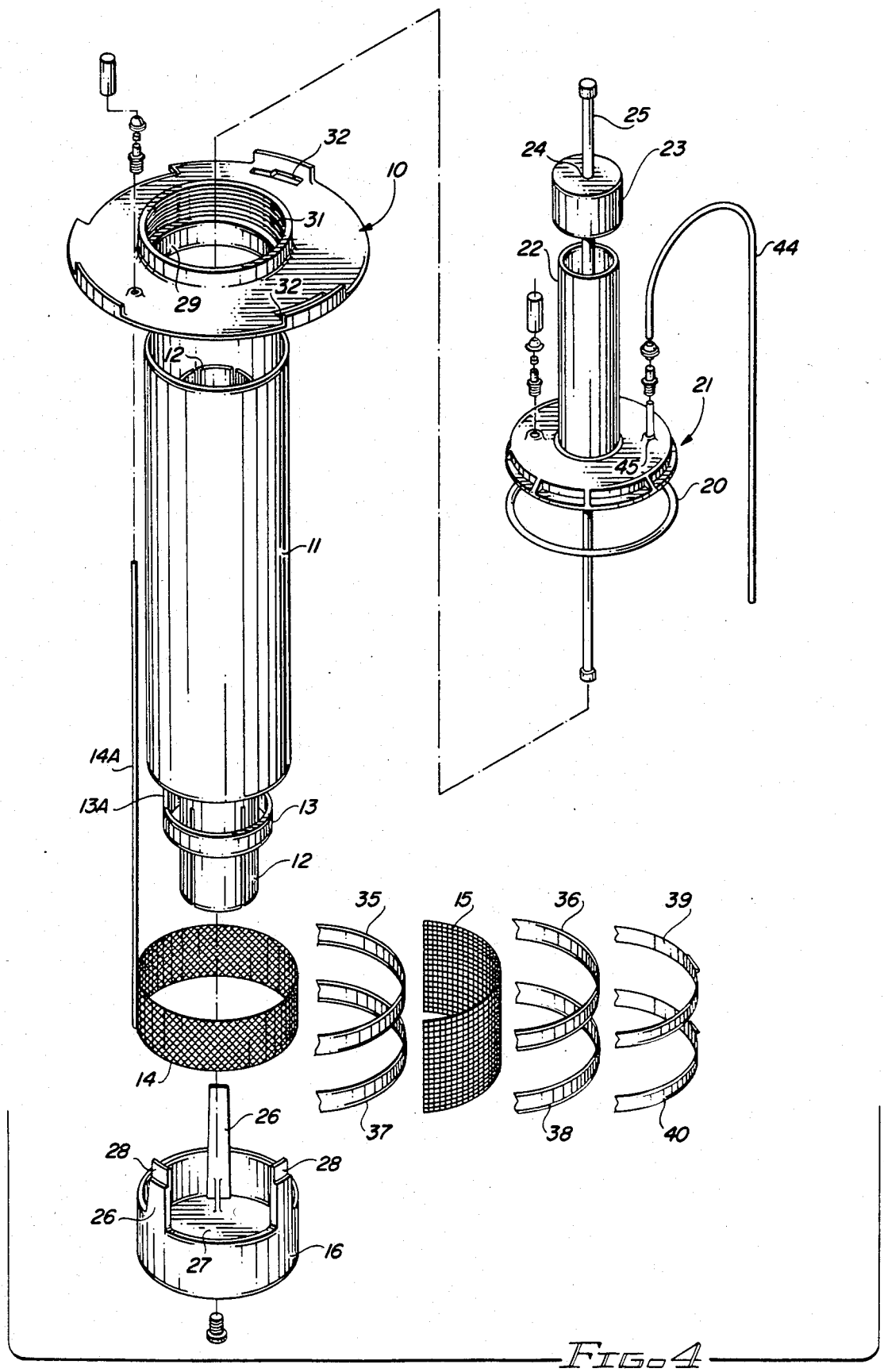
FIG. 4 is an exploded assembly view of portions of the elecrolytic chlorine gas generating apparatus of FIG. 1; and, FIGS. 5 to 8 illustrate alternate embodiments of the salt spacer in the apparatus of FIG. 1.

As shown in FIG. 4, cup 16 includes circular floor 27 and three upstanding equally spaced notched arms 26. The notches 28 formed in the upper ends of arms 26 receive and support the lower circular edge of cylindrical hollow salt cell 11 in the manner illustrated in FIG. 2. The upper end of cylindrical salt cell 11 is adhesively secured inside cylindrical downwardly extending lip 29 of circular flange 10. Externally threaded neck of cover 21 is turned into internally threaded aperture 31 of flange 10. L-shaped "hook" apertures 32 formed in flange 10 receive upwardly extending L-shaped "bayonet" members 33 of plate 19. Accordingly, flange 10 is secured on plate 33 by placing apertures 32 over members 33 and rotating flange 10 with respect to plate 19.

The cathode includes rod 14A and circular mesh 14 attached to rod 14A. The anode includes rod 13A and circular panel 13 secured to rod 13A. Conventional direct current means are attached to the anode and cathode to cause electricity to flow therethrough and through the aqueous solution intermediate mesh 14 and plate 13. Air vent slots 34 are formed in plate 19. The upper and lower edges of cylindrical membrane member 15 are sandwiched between circular strip pairs 35, 36 and 37, 38, respectively, and are secured to the lower end of salt cell 11 and to cup 16, respectively, by circular band clamps 39, 40, respectively, in the manner indicated in FIG. 2. Cylindrical hollow salt spacer 12 free stands on floor 27 of cup 16 and includes perforations, or slots, 41-43 formed therein. Chlorine gas produced at anode plate 13 is removed from the apparatus through tube 44 attached to aperture 45 formed in cover 21.

In use of the apparatus of FIGS. 1 to 4, cap 23 is removed and salt particles are poured through site tube 22 into salt spacer 12. Water is poured through tube 22 to fill spacer 12 and salt cell 11 to a desired level 46. The upper surface 47 of salt particles in salt spacer 12 is preferably beneath water line 46; however, for sake of discussion the upper surface 47 is illustrated in ghost outlines as being above the water line 46. Water is added to the hollow housing through conduit 49 to fill the housing to a desired level 50. Direct current applied to the anode and cathode cause chlorine ions in the water adjacent panel 13 to form chlorine gas which rises upwardly in the water intermediate spacer 12 and salt cell 11 into the space 51 above water level 46. As chlorine gas accumulates in space 51 it is drawn off through tube 44. Perforations 41-43 in spacer 12 are sized to generally prevent salt particles from traveling outwardly from within spacer 12, through perforations 41-43, and into the water between spacer 12 and cell 11. Consequently, while chlorine and sodium ions are able to freely travel from within spacer 12 outwardly into the water between spacer 12 and cell 11, salt particles are generally prevented from contacting anode plate 13. Since plate 13 does not directly contact salt particles, the formation of electrolytic salt by-product crust on plate 13 is greatly reduced or eliminated. Furthermore, since plate 13 is positioned intermediate space 12 and cell 11, chlorine gas produced at plate 13 generally, as earlier noted, travels upwardly in the direction of arrows A between spacer 12 and cell 11 and does not enter spacer 12. This is important because if the water level in spacer 12 falls below the upper surface 47 of the mass of salt particles in spacer 12, upper surface 47 tends to solidify into a gas impervious dome and trap chlorine gas underneath the dome. Such entrapment of chlorine gas can result in explosions. Even if chlorine gas would accumulate beneath a solidified salt surface 47, in spacer 12, the gas could, when a sufficient amount had accumulated, escape through perforations 41.

In the presently preferred embodiment of the invention, the diameter of salt cell 11 is five inches, and of spacer 12 is four inches. Slots 41 are each spaced above or below an adjacent slot by a distance of one inch. The vertical height or thickness of each slot is 0.05 to 0.06 inch, a size which generally prevents salt particles from escaping through slots 41. Slots 42 and 43 also have a thickness of approximately 0.05 to 0.06 inch.

The diameter of site tube 22 is large enough so that an individual can, after cap 23 is removed, simultaneously look down inside tube 22 with both eyes. The site tubes on similar older conventional chlorine gas generating apparatus only permit a single eye to be used because such older site tubes are of a relatively small diameter. Permitting an individual to use both eyes enables the individual to better utilize his depth perception to determine the level of salt and water in spacer 12. This reduces the likelihood that excessive amounts of water and salt will be added to spacer 12 and tube 44 will be clogged. Site tube 22 extends below top plate 51 to cover 21 to bound doughnut-shaped open buffer area 60 circumscribing tube 22. If salt cell 11 is overfilled with water, buffer area 60 will accept a quantity of water. Since the user can, by looking down tube 22 with both eyes, readily discern when water is rising up into site tube 22, buffer area 60, in conjunction with site tube 22, normally prevents the apparatus of the invention from being overfilled with water and salt by an amount which permits water to flow into tube 44.

Figure 2:
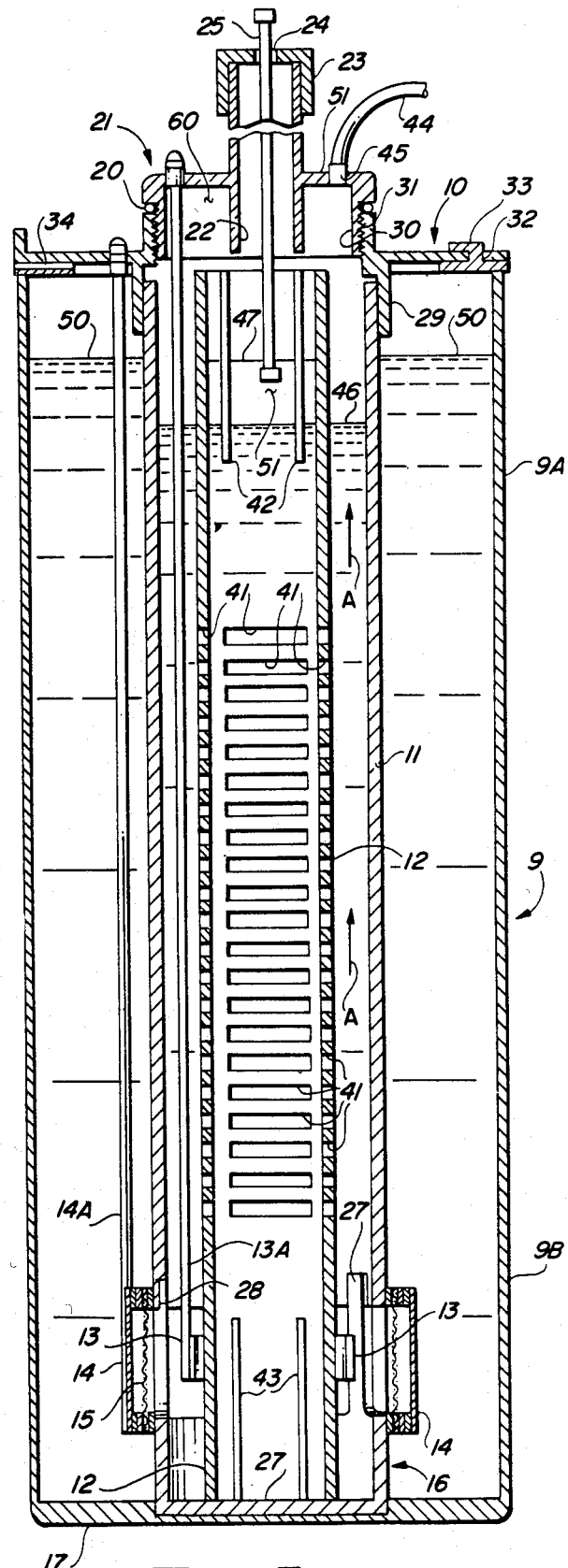
FIG. 2 is a section view of the chlorine gas generating apparatus of FIG. 1 taken along section lines 2—2 thereof and further illustrating internal construction details thereof.
Figure 3:
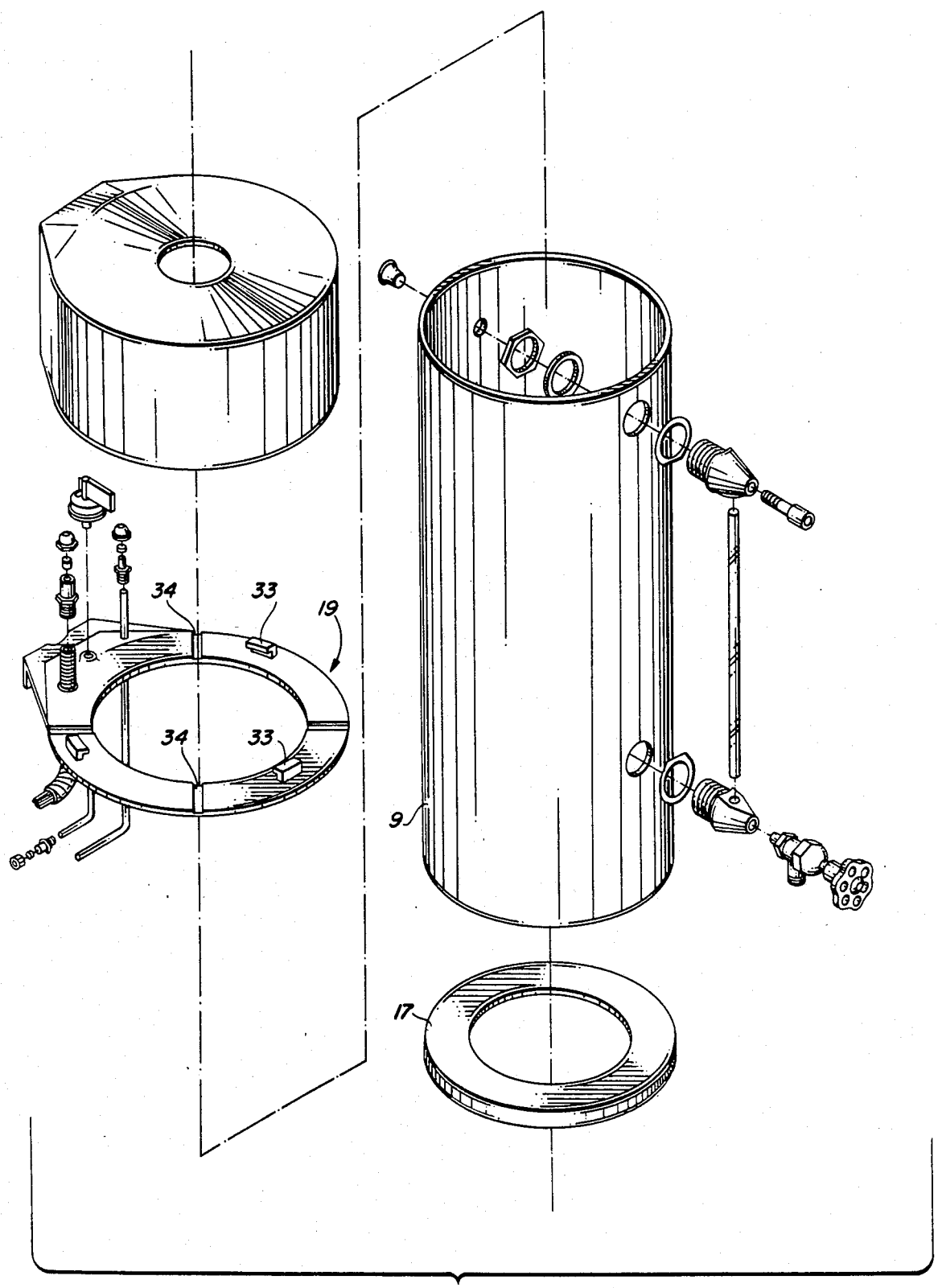
FIG. 3 is an exploded assembly view of portions of the electrolytic chlorine gas generating apparatus of FIG. 1.

Membrane 15 keeps aqueous salt solution in salt cell 11 separated from the water and sodium hydroxide solution outside cell 11. The level of the water—sodium hydroxide solution is indicated in FIG. 2 by reference character 50. The level of the aqueous salt solution is indicated by reference character 46. In FIG. 2, the salt particles in spacer 12 are omitted for sake of clarity, but, as would be appreciated by those of skill in the art, the salt particles fill spacer 12 from floor 37 up to the points indicated by dashed line 47. During use of the apparatus, the salt particles are gradually consumed and the upper level 47 of the particles gradually lowers toward floor 27. As earlier described, slots 41–43 of spacer 12 are sized to generally prevent salt particles from passing from inside space 12 through slots 41–43 to a position intermediate spacer 12 and cell 11.

Figure 5:
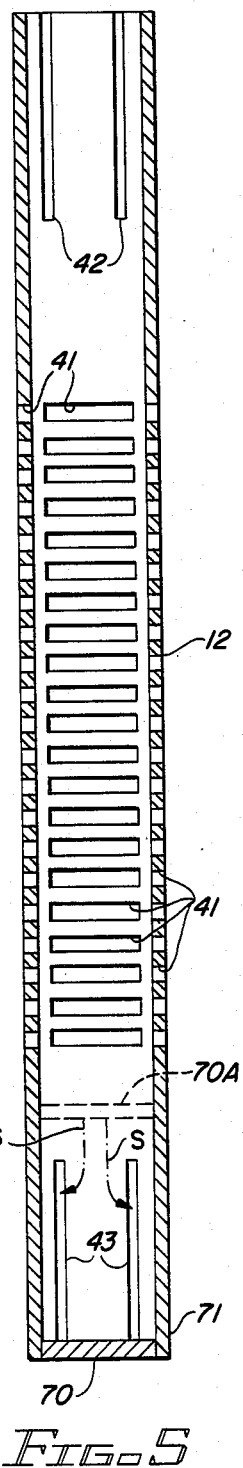
Figure 6:
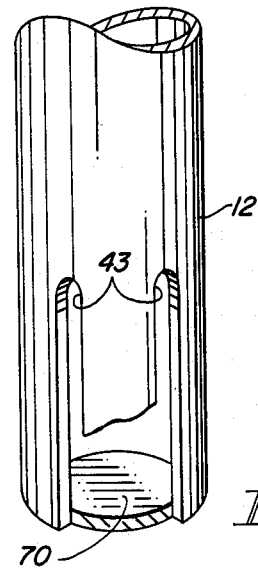
Figure 7:
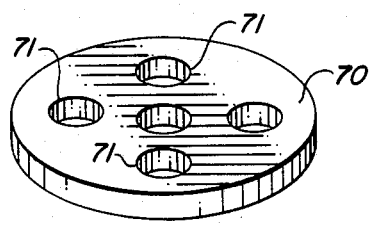

An alternate embodiment of salt spacer 12 is illustrated in FIGS. 5 and 6 and includes a circular panel 70 attached to the bottom 72 of spacer 12. Bottom panel 70 is important because when there are salt crystals in spacer 12, spacer 12 and the salt crystals in spacer 12 can be simultaneously lifted upwardly in the direction of arrow A in FIG. 2 and removed from the chlorinator apparatus after cover 21 is unthreaded and removed. If spacer 12 is not provided with a bottom panel 70, the salt remains in the chlorinator on the bottom floor 27 when spacer 12 is upwardly removed from the chlorinator apparatus. When salt particles remain in the chlorinator unit on floor 27, they can contact anode plate 13 and form a crust on plate 13. Plate 70 can be perforated 71 in the manner shown in FIG. 7. Bottom panel 70 can be connected to spacer 12 at any desirable location along the length thereof. Dashed lines 70A in FIG. 5 illustrate one such alternate location. When bottom panel 70 is in the position indicated by dashed lines 70A, it is particularly desirable to form perforation 71 in panel 70 to permit salt ions to migrate downwardly in the paths of travel indicated by arrows S and outwardly through slots 43. Perforations 71 are preferably sized to prevent solid salt particles from falling downwardly through slots 43. Bottom panel 70 therefore provides significant advantages in the utilization of the invention.

Figure 8:
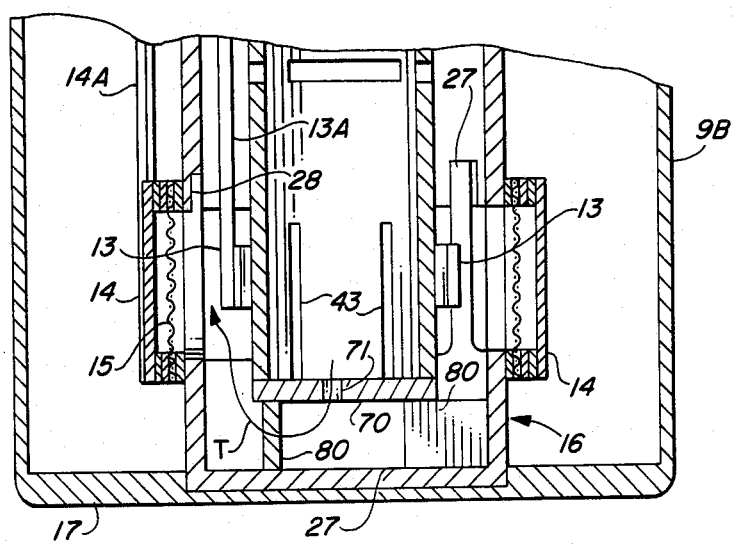

In FIG. 8, the circular perforated panel 70 attached to the bottom of salt spacer 12 rests on spaced apart support panels or fins 80. Each upstanding panel 80 is connected to the inner wall of cylindrical cup 16 and extends outwardly therefrom. Panels 80 support spacer 12 and panel 70 resting on the upper edges of panels 80. Panels 80 are important because they permit salt brine from within spacer 12 to downwardly travel through perforations 71 in panel 70 in the direction of arrow T. Salt brine travels downwardly through perforations 71. After the brine reacts with anode 13, the water and chlorine gas produced at anode 13 travel upwardly in the direction indicated by arrow T. Consequently, elevating bottom panel 70 above the floor 27 of cup 16 on panels 80 facilitates the circulation of water downwardly through the perforations 71 and then upwardly between spacer 12 and salt cell 11 after the salt in the water has been depleted at anode 13. Water rising upwardly between spacer 12 and cell 11 reenters spacer 12 through slots 41 formed therein. The afore-described circulation of water downwardly through panel 70, upwardly between spacer 12 and cell 11, and through slots 41 into spacer 12 causes the apparatus to remain unusually clean in operation.

Having described my invention in such terms as to enable those skilled in the art to understand and practice it, and having identified the presently preferred embodiments and best mode thereof, I claim:

1. Apparatus for electrolytically generating chlorine gas from a salt solution, comprising
 (a) hollow housing means for holding a volume of water and including
  (i) an outer wall having an upper portion and a lower portion,
  (ii) a base connected to said lower portion, and
  (iii) cover means mounted on said upper portion of said housing means;
 (b) an elongate hollow salt cell spaced apart from said outer wall and having a window formed therein;
 (c) a first aqueous solution of sodium ions intermediate said salt cell and said outer wall;
 (d) a second aqueous salt solution inside said hollow salt cell and having an upper surface;
 (e) an elongate hollow salt spacer having a bottom portion and carried in said housing means inside and spaces apart from said salt cell, and including a plurality of spaced apart perforations formed therein, said second solution being both intermediate said spacer and salt cell and being inside said spacer;
 (f) a volume of salt particles inside said salt spacer and having an upper surface;
 (g) anode means mounted in said housing means adjacent said window and intermediate said salt cell and said salt spacer, said salt spacer extending upwardly from said anode means to a point above said upper surface of said second solution and said upper surface of said salt, said perforations in said spacer being intermediate said anode and said upper surface of said salt;
 (h) cathode means mounted in said housing means adjacent and spaced apart from said anode and intermediate said anode and said housing; and,
 (i) membrane means intermediate said anode and cathode means and covering said window to generally separate said second solution in said salt cell from said first solution, said membrane permitting sodium ions to migrate outwardly from said second solution through said membrane means into said first solution intermediate said salt cell outer wall;
 salt ions from within said salt spacer moving outwardly through said perforations and downwardly intermediate said salt spacer and salt cell through said second solution to contact said anode means to produce chlorine gas rising upwardly intermediate said salt cell and spacer through said second aqueous solution and traveling near said perforations and through said salt ions moving outwardly from said perforations to said upper surface of said second aqueous solution, and
 said perforations permitting chlorine gas collecting inside said salt spacer when said upper surface of said salt is solid to outwardly escape through at least one of said perforations into said second aqueous solution intermediate said spacer and salt cell and rise to said upper surface of said second aqueous solution; and,
 (j) a panel attached to said bottom portion of said salt spacer to support said volume of salt particles in said salt spacer and to permit said salt spacer to be removed from said apparatus with said salt particles retained in said spacer.

2. The apparatus of claim 1 wherein said bottom panel includes a plurality of perforations formed therein, said perforations in said bottom panel being sized to prevent said salt particles from falling downwardly therethrough and being sized to permit salt ions from within said salt spacer to move downwardly through said perforations of said bottom panel when said bottom portion is immersed in water.

* * * * *